Figure 1:
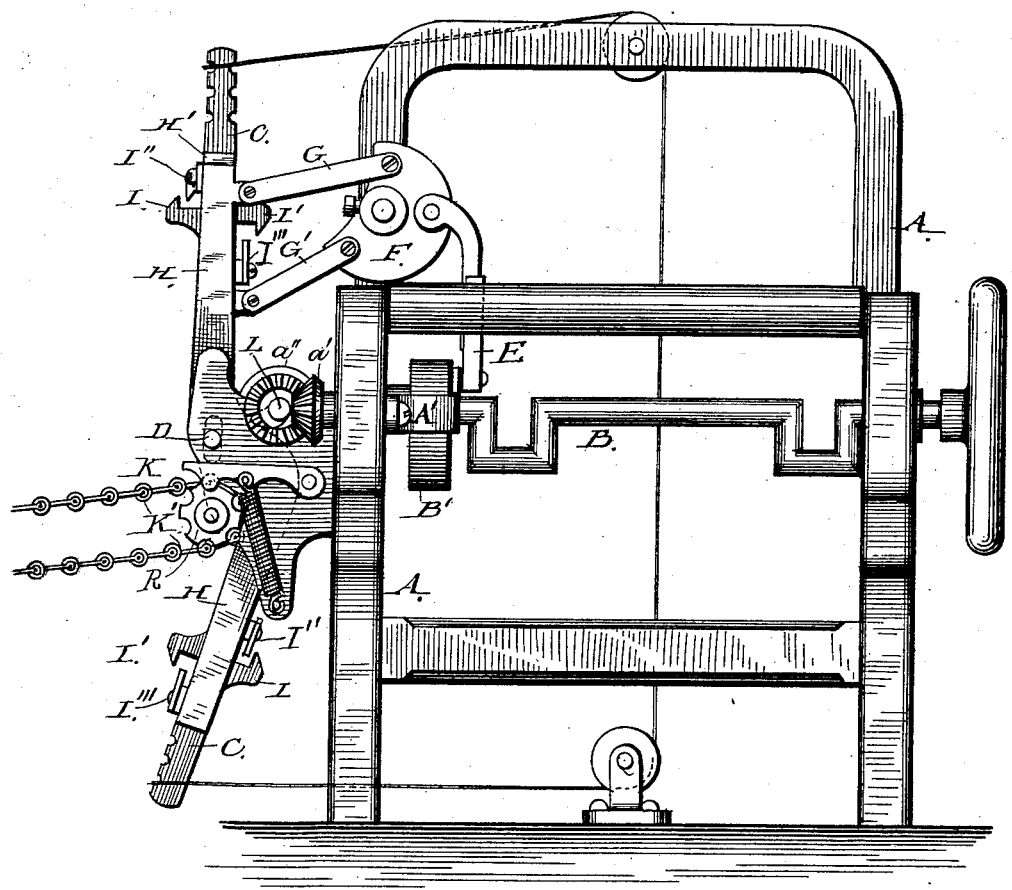

(No Model.) 2 Sheets—Sheet 1.

J. T. CREE.
SHEDDING MECHANISM FOR LOOMS.

No. 341,133. Patented May 4, 1886.

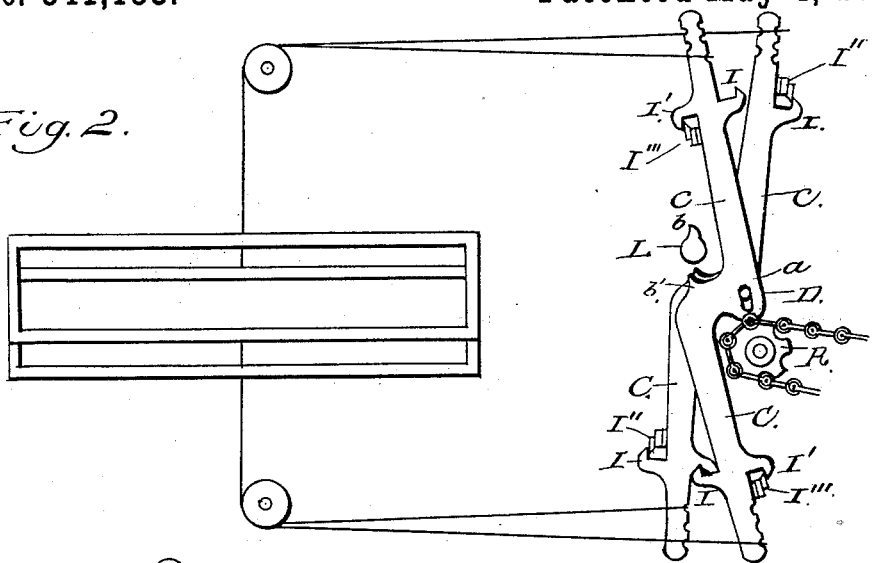
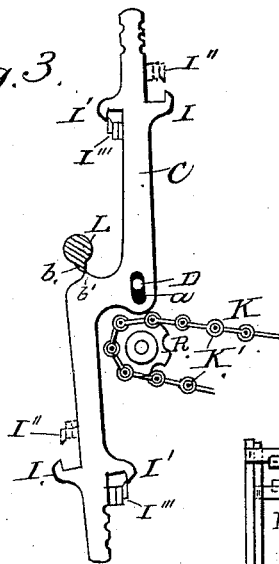
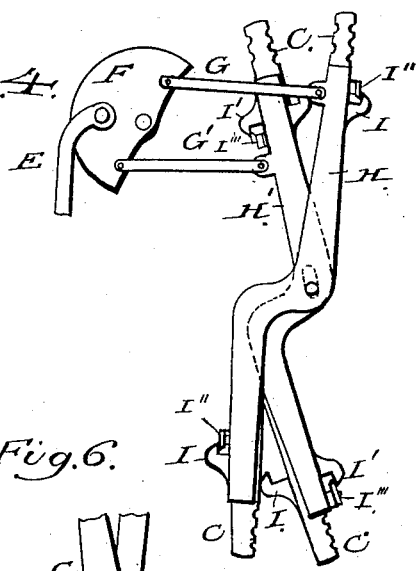
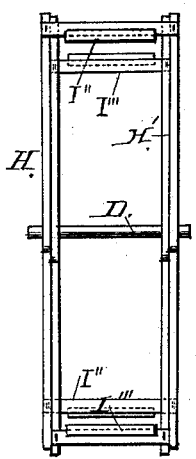
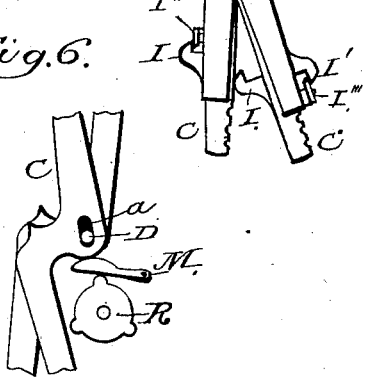

UNITED STATES PATENT OFFICE.

JAMES THOMPSON CREE, OF WORCESTER, MASSACHUSETTS.

SHEDDING MECHANISM FOR LOOMS.

SPECIFICATION forming part of Letters Patent No. 341,133, dated May 4, 1886.

Application filed July 30, 1885. Serial No. 173,053. (No model.)

*To all whom it may concern:*

Be it known that I, JAMES THOMPSON CREE, a citizen of the United States, residing at Worcester, in the county of Worcester and State of Massachusetts, have invented certain new and useful Improvements in Shedding Mechanism for Looms, of which the following is a full, clear, and exact description, reference being had to the accompanying drawings, forming part of this specification, in which—

Figure 1 represents a side elevation of a portion of a loom embodying my improvements. Figs. 2, 3, 4, 5, and 6 are detached views illustrating my invention, and which I will hereinafter specifically refer to.

My invention relates to the mechanism for operating the heddles in fancy looms; and the same consists, essentially, in placing the heddle-levers in direct contact with the pattern-chain, said heddle-levers being held in position by a shaft which passes through a slot formed at or near the center of each heddle-lever. It also consists in suitable "risers" and "sinkers" bolted to frames upon each side of the levers.

It further consists in a cam placed in the rear of the heddle-levers, and in the peculiar construction and combination of devices, all of which will be hereinafter fully described, and specially pointed out in the claims.

In the said drawings, A represents the frame of a loom, and B the operating or crank shaft, both being of usual construction and forming no part of this invention.
The heddle-levers C are placed in the machine in such manner that they are in direct contact with the pattern-chain. These levers are each provided with projections I i', with which the risers and sinkers engage, and a central elongated slot, a, through which passes a transverse shaft, D, the ends of said shaft being suitably journaled in an extension of the main frame A. The slots a give the pattern-chain rolls room to move the levers upward until they come into engagement with suitable risers, as I shall hereinafter describe.

The operating-shaft B is provided with a cam, B', and the frame A has a projecting arm, A', carrying a friction-roller or suitable device, which engages the cam-groove, and the arm A' being connected to the pitman E, it is manifest that the motion of said arm A' is communicated to the pitman, and from it to the rocker F, as shown in Fig. 1. A connecting rod or pitman, G, pivotally secured to the rocker F, extends to the upright frame H, while a similar rod, G', is pivoted to the rocker F at a point diametrically opposite to the arm G, and thence extends to the upright frame H', these frames H and H' carrying, respectively, the risers and sinkers I" and I''', which are placed near the upper and lower ends of the jacks, thereby giving an increased leverage or lifting-power.

K represents the pattern-chain, and K' the chain-rolls, the chain passing around a barrel, R, which is operated in the usual manner, it being understood that the chain-rolls cause the jacks to be lifted, so that the risers may engage and actuate the levers to raise the heddle-frames. The rolls on the pattern-chain are intended, as usual, to determine which way the levers shall be vibrated, and thereby whether the heddles connected therewith shall be raised or depressed.

Secured to one end of the operating-shaft B is a gear-wheel, a', which meshes with a similar gear-wheel, a'', on one end of the transverse shaft L, said shaft being placed at the rear of the levers, and provided with a cam-surface, b, the said cam receiving its motion from the operating-shaft, and operating every time the "sheds" close to depress the levers into position to be acted upon by the next succeeding chain-roll.

In Fig. 2 the rearmost heddle-lever is illustrated as in the raised position it assumes upon being engaged by one of the rolls on the pattern-chain, the said lever being thereby moved vertically and caught and moved by the risers I" into the position shown to raise its connected heddle-frame. Where there are no rolls on the pattern-chain or projections on the chain-roll, the levers remain down on the sinkers I''' and are engaged and moved by said sinkers, as shown in the case of the front lever in Fig. 2, thereby depressing their connected heddle-frames.

In Fig. 3 the heddle-lever is in the position it would assume after the frames H H' and risers and sinkers carried thereby have returned to the positions shown in Fig. 1 and the shed has been closed. Said figure shows the cam-surface b of the shaft L engaging the projection b' on the lever, to force said lever to its normal depressed position, preparatory to said lever being operated upon again by the pattern-chain for the next shed, thereby preventing any possibility of what are commonly known as "miss-picks" and dispensing with the weight or spring often employed to cause the lever to assume its normal position.

Fig. 4 represents the frames H H' and risers and sinkers secured thereto. It will be observed these frames are mounted upon the same pivotal shaft as the heddle-levers, and carry at or near their extreme upper and lower ends the risers and sinkers. This locating the risers and sinkers at the ends of the frames, instead of near the center, has been found by experiment to greatly strengthen said frames.

Fig. 5 represents a side view of the frames H H', showing the shaft upon which they oscillate, and the risers secured at the extreme upper and lower ends of frames H.

In Fig. 6 is shown a barrel, R, having lugs or cams formed thereon, a finger, M, being mounted between said barrel and each of the levers, and designed to prevent the lugs injuring that portion of the lever with which the lug would engage if the finger were not interposed.

Having thus described my invention, what I claim as new, and desire to secure by Letters Patent, is—

1. The combination, with the rocker F, the pitmen G G', mechanism, substantially as described, for operating the rocker, the pattern-chain and barrel, and the oscillating frames H H', provided with risers and sinkers at the extreme upper and lower ends of the same, of the heddle-levers C, having at or near their centers elongated slots a, whereby the levers may be vertically moved, and the transverse shaft D, upon which both the frames and levers are mounted, substantially as herein described.

2. The main frame, the operating-shaft, a cam mounted thereon, a rocker mounted on the main frame, a lever or arm, A', a pitman connecting the arm and rocker, and the pitmen G G', in combination with the pivoted frames H H', a transverse shaft, D, journaled in an extension of the main frame, and upon which the frames H H' are mounted, a pattern-chain and barrel, the heddle-levers mounted upon the shaft D and provided at or near their centers with elongated slots a, and the risers and sinkers secured, respectively, to the extreme upper and lower ends of the frames H H', substantially as herein described.

3. The main frame, the operating crank-shaft, a cam thereon, a rocker, F, an arm, A', a pitman connecting the arm with the rocker, and the pitmen G G', in combination with the oscillating frames H H', to which the pitmen G G' are connected, the centrally-slotted vertically-moving heddle-levers, the shaft D, a pattern-chain and barrel, and the risers and sinkers secured to the frames H and located at the extreme ends of the levers, substantially as herein described.

4. The combination, with the slotted vertically-moving heddle-levers, and mechanism, substantially as shown and described, for operating said levers, of the shaft L, and a cam upon the shaft adapted to engage a lug upon the heddle-levers, substantially as and for the purpose set forth.

5. The combination, with the chain-barrel and pattern-chain, of the slotted heddle-levers adapted to be vertically moved by said chain, the risers and sinkers placed near the ends of said heddle-levers, the frames H H' and their operative mechanism, the transverse shaft at the rear of the heddle-levers provided with a cam, b, and mechanism comprising the operating crank-shaft, and the gears a' a'' for causing the cam to operate to depress the heddle-levers every time the shed closes, substantially as herein described.

JAMES THOMPSON CREE.

Witnesses:
RUFUS B. DODGE, Jr.,
ORRIN H. LEARNED.